J. L. DUNN.
BABY COMFORTER.
APPLICATION FILED FEB. 15, 1911.
1,070,430.
Patented Aug. 19, 1913.
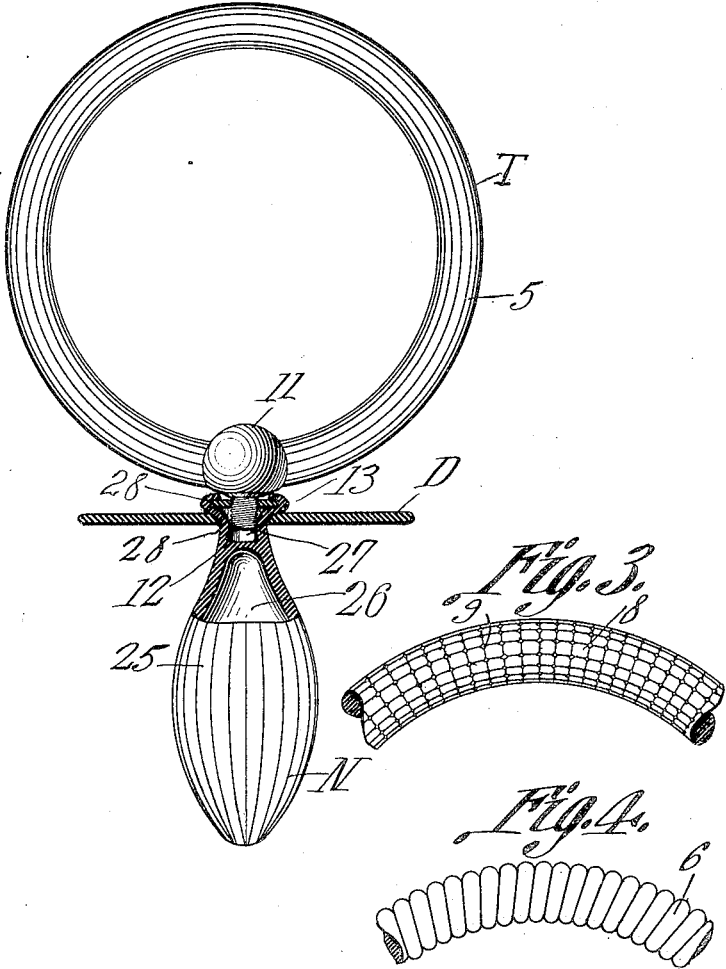
Witnesses
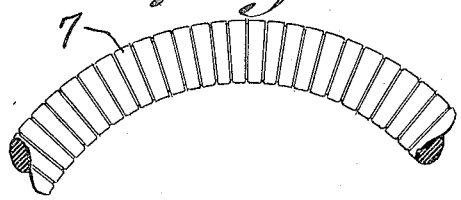
Joseph L. Dunn, Inventor
by ...... Attorneys

UNITED STATES PATENT OFFICE.

JOSEPH L. DUNN, OF ALBANY, NEW YORK.

BABY-COMFORTER.

1,070,430.  Specification of Letters Patent.  Patented Aug. 19, 1913.

Application filed February 15, 1911. Serial No. 608,737.

*To all whom it may concern:*

Be it known that I, JOSEPH L. DUNN, a citizen of the United States, residing at Albany, in the county of Albany and State of New York, have invented a new and useful Baby-Comforter, of which the following is a specification.

This invention relates to comforters for the use of infants; and the object of the same is to produce an article of this character which combines with a corrugated teething ring a soft nipple for the young infant in a novel manner.

To this end the invention consists in the details of construction hereinafter more fully described and claimed, and as shown in the drawings wherein—

Figure 1 is an elevation of a ring having secured thereto a shank provided with a threaded stem, and a sectional view of a disk and nipple detachably connected with said stem. Figs. 2, 3, and 4 are fragmentary views of rings having their surfaces differently finished.

Referring specifically to the drawings, the teething ring has been denoted generally by the letter T, which may be constructed of ivory, rubber, celluloid, bone or other suitable material and which preferably has its surface corrugated to assist in denting the gums of the infant. As shown in Fig. 1, the corrugations 5 extend longitudinally of the ring; in Fig. 3 the ring is provided with longitudinal and transverse corrugations 8 and 9; in Fig. 4, the ring is provided with a spiral or helical corrugation 6; while in Fig. 2 the ring is provided with only the transverse corrugations 7.

The ring shown in Fig. 1 is provided with a spherical enlargement 11, and a threaded stem 12 projects from the said enlargement in order to attach the nipple N and the guard disk D to the teething ring.

The nipple N is constructed of rubber or other suitable material and is provided with a cavity or chamber 26, the nipple being non-deflatable and being provided with an independent socket 27 at its inner end. The nipple is also preferably provided with longitudinal corrugations 25 on its surface.

In attaching the nipple and guard disk to the teething ring, a nut or collar 13 is run onto the stem 12, and the inner end of the nipple is inserted through a central aperture provided in the disk D, the edge 28 of the socket 27 being stretched over the nut 13, so that the disk D is positioned outwardly relative to the nut. The nipple in being non-deflatable will prevent the disk from being casually removed therefrom, the disk serving to prevent the infant from biting the inner end of the nipple which is disposed over the stem 12 and the nut 13. It is also clearly evident from the foregoing, that by further running the nut on the stem, the edge 28 of the socket 27 may be brought into engagement with the enlargement 11.

What is claimed is:

In combination, a teething ring having a spherical enlargement and a threaded stem projecting from the enlargement, a member run onto the stem, a hollow nipple having an independent socket at its inner end, the edge of the socket being stretched over the said member, and a disk fitting over the nipple outwardly relative to the said member.

In testimony that I claim the foregoing as my own, I have hereto affixed my signature in the presence of two witnesses.

JOSEPH L. DUNN.

Witnesses:
G. M. CRAFT,
W. H. STEPHENSON.

---

Copies of this patent may be obtained for five cents each, by addressing the "Commissioner of Patents, Washington, D. C."